United States Patent [19]

Estelle

[11] Patent Number: 4,756,609

[45] Date of Patent: Jul. 12, 1988

[54] FOUR COMPONENT COMPACT ZOOM LENS

[75] Inventor: Lee R. Estelle, Rochester, N.Y.

[73] Assignee: Eastman Kodak Company, Rochester, N.Y.

[21] Appl. No.: 72,945

[22] Filed: Jul. 13, 1987

[51] Int. Cl.⁴ .................... G02B 15/14; G02B 9/34
[52] U.S. Cl. ............................. 350/427; 350/425
[58] Field of Search .................... 350/427, 423, 425

[56] References Cited

U.S. PATENT DOCUMENTS

| 3,267,803 | 8/1966 | Macher et al. | |
| 3,532,414 | 10/1970 | Higuchi et al. | |
| 3,682,534 | 8/1972 | Cook et al. | |
| 3,697,155 | 10/1972 | Ruben | |
| 3,771,853 | 11/1973 | Nakamura | |
| 3,848,969 | 11/1974 | Tajima | |
| 3,901,585 | 8/1975 | Bennett et al. | |
| 4,196,969 | 4/1980 | Itoh | |
| 4,437,732 | 3/1984 | Ishiyama | 350/427 |
| 4,437,733 | 3/1984 | Takahashi et al. | 350/427 |

FOREIGN PATENT DOCUMENTS 2831986 2/1980 Fed. Rep. of Germany ...... 350/425

Primary Examiner—John K. Corbin
Assistant Examiner—Rebecca D. Gass
Attorney, Agent, or Firm—John B. Turner

[57] ABSTRACT

A compact zoom lens comprising four components each movable axially to vary the focal length through a range of at least 2.5:1. There is a front negative, a positive component, a positive cemented doublet component and a rear negative component comprising three elements. A diaphragm is mounted with the first-mentioned positive component.

12 Claims, 8 Drawing Sheets

| GROUP | LENS | RADIUS | THICKNESS | SPACING | REFRACTIVE INDEX $N_d$ | Abbé No. $V_d$ |
|---|---|---|---|---|---|---|
| | | | | $S_1=\infty$ | | |
| 27 | A | $R_1=-25.7439$ | $t_1=2.500$ | | 1.71301 | 53.8 |
| | | $R_2=-99.0606$ | | | | |
| | | | | $S_2=(7.622$ at $35.06$ | | |
| | | | | $(5.789$ at $50.48$ | | |
| | | | | $(3.266$ at $72.77$ | | |
| | | | | $(1.000$ at $104.56$ | | |
| | | Diaphragm | | $FS_1=0.200$ | | |
| 29 | B | $R_3=$ asphere | $t_3=3.800$ | | 1.80400 | 46.6 |
| | | $R_4=-50.2153$ | | | | |
| | | | | $S_3=(8.023$ at $35.06$ | | |
| | | | | $(7.420$ at $50.48$ | | |
| | | | | $(6.221$ at $72.77$ | | |
| | | | | $(5.109$ at $104.56$ | | |
| | | $R_5=46.3678$ | | | | |
| 31 | C | $R_6=16.5287$ | $t_4=1.500$ | | 1.84666 | 23.8 |
| | D | | $t_5=6.269$ | | 1.49783 | 67.0 |
| | | $R_7=-23.9031$ | | | | |
| | | | | $S_4=(8.699$ at $35.06$ | | |
| | | | | $(4.353$ at $50.48$ | | |
| | | | | $(1.973$ at $72.77$ | | |
| | | | | $(0.500$ at $104.56$ | | |
| | | $R_8=-50.4295$ | | | | |
| | E | $R_9=-18.7258$ | $t_7=4.58$ | | 1.84666 | 23.8 |
| | | | | $FS_2=0.100$ | | |
| | | $R_{10}=-22.1134$ | | | | |
| 33 | F | | $t_9=1.8$ | | 1.79952 | 42.2 |
| | | $R_{11}=-58.7660$ | | | | |
| | | | | $FS_3=3.588$ | | |
| | | $R_{12}=-16.8917$ | | | | |
| | G | | $t_{11}=2.00$ | | 1.69100 | 54.7 |
| | | $R_{13}=146.044$ | | | | |
| | | | | $S_5=(8.25$ at $35.06$ | | |
| | | | | $(21.80$ at $50.48$ | | |
| | | | | $(39.76$ at $72.77$ | | |
| | | | | $(64.20$ at $104.56$ | | |

FIG. 2

| FOCAL LENGTH mm | BACK FOCAL LENGTH mm | LENS LENGTH mm | LENGTH FROM FRONT VERTEX TO IMAGE PLANE mm | TELEPHOTO RATIO |
|---|---|---|---|---|
| 35.06 | 8.25 | 50.682 | 58.93 | 1.68 |
| 50.48 | 21.80 | 43.899 | 65.70 | 1.30 |
| 72.77 | 39.76 | 37.797 | 77.56 | 1.07 |
| 104.56 | 64.20 | 32.946 | 97.15 | 0.93 |

Ratio of the extreme focal lengths: 2.98:1

FIG. 3

| GROUP | LENS | RADIUS | THICKNESS | SPACING | REFRACTIVE INDEX $N_d$ | Abbé No. $V_d$ |
|---|---|---|---|---|---|---|
| | | | | $S_1'=\infty$ | | |
| 27' | A' | $R_{21}=-26.5947$ | $t_{21}=2.500$ | | 1.57958 | 53.7 |
| | | $R_{22}=-166.152$ | | | | |
| | | | | $S_2'=$(7.771at35.02 (7.353at50.49 (4.816at72.80 (1.000at104.79 | | |
| | | Baffle | | | | |
| | | $R_{23}=$asphere | | $FS_{21}=0.200$ | | |
| 29' | B' | | $t_{22}=4.000$ | | 1.53172 | 48.8 |
| | | $R_{24}=-27.4940$ | | $FS_{22}=4.600$ | | |
| | | Diaphragm | | | | |
| | | | | $S_3'=$(4.419at35.02 (3.312at50.49 (2.183at72.80 (1.563at104.79 | | |
| | C' | $R_{25}=54.4437$ | $t_{23}=1.5$ | | 1.84666 | 23.8 |
| 31' | | $R_{26}=15.0805$ | | | | |
| | D' | | $t_{24}=5.125$ | | 1.49783 | 67.0 |
| | | $R_{27}=-17.0839$ | | | | |
| | | | | $S_4'=$(6.161at35.02 (2.723at50.49 (1.121at72.80 (0.500at104.79 | | |
| | E' | $R_{28}=-40.7438$ | $t_{25}=5.645$ | | 1.84666 | 23.8 |
| | | $R_{29}=-10.5410$ | | | | |
| 33' | F' | | $t_{26}=3.890$ | | 1.70181 | 41.0 |
| | | $R_{30}=-150.263$ | | $FS_{23}=3.890$ | | |
| | G' | $R_{31}=-13.9956$ | $t_{27}=2.000$ | | 1.65016 | 39.2 |
| | | $R_{32}=1438.91$ | | | | |
| | | | | $S_5'=$(7.95at35.02 (21.46at50.49 (38.41at72.80 (58.69at104.79 | | |

FIG. 5

| FOCAL LENGTH | BACK FOCAL LENGTH | LENS LENGTH | LENGTH FROM FRONT VERTEX TO IMAGE PLANE | TELEPHOTO RATIO |
|---|---|---|---|---|
| 35.02 | 7.95 | 49.611 | 57.56 | 1.64 |
| 50.49 | 21.46 | 44.648 | 66.11 | 1.31 |
| 72.80 | 38.41 | 39.380 | 77.79 | 1.07 |
| 104.79 | 58.69 | 34.323 | 93.01 | 0.89 |

Ratio of the extreme focal lengths: 2.99:1

FIG. 6

| GROUP | LENS | RADIUS | THICKNESS | SPACING | REFRACTIVE INDEX $N_d$ | Abbé No. $V_d$ |
|---|---|---|---|---|---|---|
| | | | | $S_1''=\infty$ | | |
| 27'' | A'' | $R_{41}=-28.9346$ | $t_{41}=2.5$ | | 1.58913 | 61.3 |
| | | $R_{42}=-170.955$ | | $S_2''=(8.701$ at $35.01$ $(8.040$ at $50.48$ $(4.990$ at $72.79$ $(0.800$ at $104.88$ | | |
| 29'' | $B_a''$ | $R_{43}=$asphere | $t_{42}=1.500$ | | 1.59044 | 30.9 |
| | | $R_{44}=32.5160$ | | $FS_{31}=0.200$ | | |
| | $B_b''$ | $R_{45}=26.4507$ | $t_{43}=4.400$ | | 1.54072 | 47.2 |
| | | $R_{46}=-32.5160$ | | $FS_{32}=3.500$ | | |
| | | Diaphragm | | $S_3''=(3.759$ at $35.01$ $(2.433$ at $50.48$ $(1.226$ at $72.79$ $(0.612$ at $104.88$ | | |
| 31'' | C'' | $R_{47}=45.5291$ | $t_{44}=1.500$ | | 1.84666 | 23.8 |
| | D'' | $R_{48}=14.1057$ | $t_{45}=5.234$ | | 1.49783 | 67.0 |
| | | $R_{50}=-18.6600$ | | $S_4''=(6.187$ at $35.01$ $(2.786$ at $50.48$ $(1.204$ at $72.79$ $(0.500$ at $104.88$ | | |
| 33'' | E'' | $R_{51}=-49.1546$ | $t_{46}=5.330$ | | 1.84666 | 23.8 |
| | F'' | $R_{52}=-10.7888$ | $t_{47}=1.800$ | | 1.70181 | 41.0 |
| | | $R_{54}=-220.343$ | | $FS_{33}=3.540$ | | |
| | G'' | $R_{55}=-14.5565$ | $t_{48}=2.000$ | | 1.65016 | 39.2 |
| | | $R_{56}=201.766$ | | $S_5''=(8.79$ at $35.01$ $(22.61$ at $50.48$ $(39.69$ at $72.79$ $(60.38$ at $104.88$ | | |

FIG. 8

| FOCAL LENGTH | BACK FOCAL LENGTH | LENS LENGTH | LENGTH FROM FRONT VERTEX TO IMAGE PLANE | TELEPHOTO RATIO |
|---|---|---|---|---|
| 35.01 | 8.79 | 50.151 | 58.94 | 1.68 |
| 50.48 | 22.61 | 44.763 | 67.37 | 1.33 |
| 72.79 | 39.69 | 38.923 | 78.61 | 1.08 |
| 104.88 | 60.38 | 33.416 | 93.80 | 0.89 |

Ratio of the extreme focal lengths: 3:00:1

FIG. 9

FOUR COMPONENT COMPACT ZOOM LENS

BACKGROUND OF THE INVENTION

1. Field of the Invention

This invention relates to compact zoom lenses including four lens groups all of which are axially movable.

2. Summary of the Invention

It is an object of the present invention to provide an objective zoom lens for a viewfinder camera, which is sufficiently compact that the front end of the zoom lens does not intrude into the field of view of the viewfinder when the viewfinder is positioned desirably close to the taking lens for avoiding viewfinder parallax. Obviously, both diameter of the front end of the zoom lens and the distance of the front end of the zoom lens from the film plane are factors in this problem. The lens may also be light in weight and easily stored.

BRIEF DESCRIPTION OF THE DRAWINGS

Embodiments of the present invention will now be described, by way of example, with reference to the accompanying drawings, in which:

FIGS. 2 and 3 are tables of constructional data for the first embodiment, illustrated in FIG. 1;

FIGS. 5 and 6 are tables of constructional data for the second embodiment, illustrated in FIG. 4;

FIGS. 8 and 9 are tables of constructional data for the third embodiment, illustrated in FIG. 7.

DETAILED DESCRIPTION OF THE PREFERRED EMBODIMENT

Figure 1:
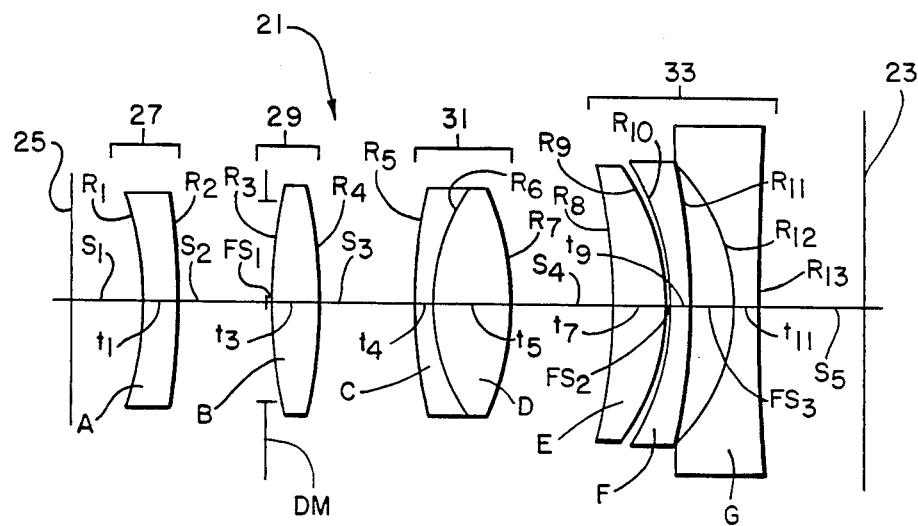
FIG. 1 schematically represents a first embodiment of the present invention.

A first embodiment of the present invention, represented in FIG. 1, is a zoom lens 21 intended to be the taking objective lens of a viewfinder camera. The lens 21 has an image plane 23 in which the film is disposed in the camera. The lens has an object plane 25. In the ensuing description, the front of the lens or of a component or element is nearer or towards the object plane 25.

The lens 21 includes four components, all of which are axially movable. There are: a front, first component 27; a second component 29; a third component 31 and a fourth, rear component 33.

Front component 27 is a negative meniscus lens element A having front and rear surfaces $R_1$ and $R_2$ and a thickness $t_1$. The values of the radii of the surfaces $R_1$, $R_2$ and the value of $t_1$ ae given in the table in FIG. 2. The front component 27 is utilized to adjust the image to focus at the image plane 23. The object plane 25 is spaced by a variable distance $S_1$ from the element A.

Spaced from front component 27 by a variable air gap is the second component 29, which is positive and includes a diaphragm DM and a double convex lens element B having a front surface $R_3$, which is aspheric, and a rear surface $R_4$. The thickness $t_3$ of the lens element B is given in the table in FIG. 2.

The aspheric surface $R_3$ conforms to the formula:

$$X = \frac{CY^2}{1 + \sqrt{1 - (K + 1)C^2Y^2}} + DY^4 + EY^6 + FY^8 + GY^{10}$$

wherein
$C = 0.02557865$
$K = 12.0445$
$D = -0.37847 \times 10^{-4}$
$E = -0.26615 \times 10^{-6}$
$F = 0.26087 \times 10^{-8}$
$G = -0.33251 \times 10^{-10}$ X is the longitudinal coordinate of a point on the surface which is a distance Y from the X axis.

The position of the diaphragm DM is determined by the variable space $S_2$ from the element A and by fixed distance FS from element B. The diaphragm DM has a clear aperture of 17.20 mm, and is movable with the lens element B.

Spaced from the second component 29 by a variable air gap $S_3$ is the third component 31 which is a positive cemented doublet including a meniscus lens element C and a double convex lens element D. The lens element C has a front surface $R_5$, a rear surface $R_6$ and a thickness $t_4$. The double convex lens element D has front and rear surfaces $R_6$ and $R_7$, respectively, and a thickness $t_5$.

Spaced from the third component 31 by a variable air gap $S_4$ is the fourth component 33 which is a two units, both units being negative, three element component and is herein termed a negative negative component. The fourth, negative negative component includes a front meniscus lens element E having front and rear surfaces $R_8$ and $R_9$, respectively, and thickness $t_7$, a middle meniscus lens element F having front and rear surfaces $R_{10}$ and $R_{11}$ and thickness $t_9$, and a double concave lens element G having front and rear surfaces $R_{12}$ and $R_{13}$, and thickness $t_{11}$. The lens elements E and F are spaced by a fixed distance $FS_2$ at the vertices of their surfaces $R_9$ and $R_{10}$. The lens elements F and G are spaced by a fixed distance $FS_3$ at the vertices of their surfaces $R_{11}$ and $R_{12}$.

As each of the four moving components increases (or decreases) its distance from its adjacent component, the change in focal length with respect to increasing (or decreasing) incremental space is of the same sign for each component. Thus, every component has a constructive contribution to the decrease (or increase) of the focal length. This contributes to the large zoom ratio and short front vertex to image plane distance exhibited.

The variation in space $S_4$ between components 31 and 33 contributes to the focal length change four or five times more than equal increments of variation in space $S_3$ and two to three times more than equal increments of variation in space $S_2$. The actual magnitude of the ratios depends on whether the lens is in wide angle or telephoto configuration.

Besides changing focal length, the increments of change of spaces $S_2$, $S_3$ and $S_4$ also partially compensate for aberrations, especially the spherical aberration in the telephoto configuration. The negative spherical aberration that results as spaces $S_2$ and $S_4$ are varied is compensated for by the positive spherical aberration that results as space $S_3$ is varied. This contributes to the stability of the aberration over the large zoom ratio.

It has been found that with four movable components aberrations are controlled to acceptable levels and a relatively large back focus is maintained.

In the third component 31, if the ratio $VR_{CD}$ of the Abbé numbers of the elements C and D is computed so that $VR_{CD}$ is greater than unity (i.e., of the two possible ratios a:b and b:a, that one is selected which gives a value greater than unity) then $3 > VR_{CD} > 1.8$. With such parameters axial color is corrected.

In the fourth component 33 the choice of glasses is such that the ratio $VR_{EF}$ of the Abbé numbers of the elements E and F is computed so that $VR_{EF}$ is greater than unity (i.e., of the two possible ratios a:b and b:a, that one is selected which gives a value greater than unity) then $3 > VR_{EF} > 1.3$. If these parameters are not observed axial and lateral color correction will not be achievable.

In order to control higher order distortion in the wide angle mode and balance the distortion and lateral color over the full zoom range, the following relationship exists:

$$0.4 > |N_C - N_D| > 0.1$$

wherein
$N_C$ is the refractive index of element C; and
$N_D$ is the refractive index of element D.

The focal lengths of each of the four components, as well as the ratio L of those lengths to the minimum effective focal length $F_s$ are given in the ensuing table:

| Component | Focal Length F | L = F/$F_s$ |
| --- | --- | --- |
| 27 | −49.27 mm | −1.41 |
| 29 | 27.73 mm | 0.79 |
| 31 | 55.29 mm | 1.58 |
| 33 | −25.12 mm | −0.72 |

The lens 21 is a positive-negative zoom lens in that the first three components 27, 29 and 31 together have a positive net power, and the rear component 33 has a negative power. The positive-negative arrangement tends to make the lens telephoto in the longer focal length modes. The table in FIG. 3 gives the back focal length; lens length; length from front vertex of the front element to the image plane (i.e., the sum of lens length and back focal length); and the telephoto ratio (i.e., length from front vertex of the front element to the image plane divided by the focal length), for each of four focal lengths including the two extreme focal lengths. As elsewhere in this specification, all linear dimensions are in mm. It will be seen that at the longest focal length, the lens has a telephoto ratio of 0.93 which is an indication of compactness. In the wide angle mode, the lens has a length, 50.68 mm, which, together with the back focal length of 8.25 mm, renders the lens comparable in its forward protrusion to a normal taking lens of a 35 mm camera which typically extends 58 mm in front of the film plane. In that the camera for which the lens is intended is a camera with a separate viewfinder, it is important that the forward protrusion of the lens not be such as to obscure a portion of the field of view of the viewfinder.

The ratio of the extreme focal lengths of this embodiment is 104.56:35.06; i.e. 2.98:1 which would normally be termed a 3:1 zoom lens.

From FIG. 3 it will be seen that at a focal length of 35.06 mm, being $F_s$, the shortest focal length, the length from the vertex of the front surface $R_1$ of the front element A to the film plane 23 is 58.93 mm, and the telephoto ratio, i.e., the ratio of that length to the focal length, $F_s$, is 1.68 which is less than 1.8. Also, at the long focal length, $F_L$, of 104.56 mm, the length from the front surface $R_1$ of the front element A to the film plane 23 is 97.15 mm, which is less than the focal length $F_L$.

The clear aperture of lens A is 15.91 mm which, together with the shortness of the distance between the vertex of the front surface $R_1$ of the front lens A and the film plane 23, ensures that a separate viewfinder can be placed close to the zoom lens without intruding on the field of view of the viewfinder, thus minimizing viewfinder parallax.

Figure 4:
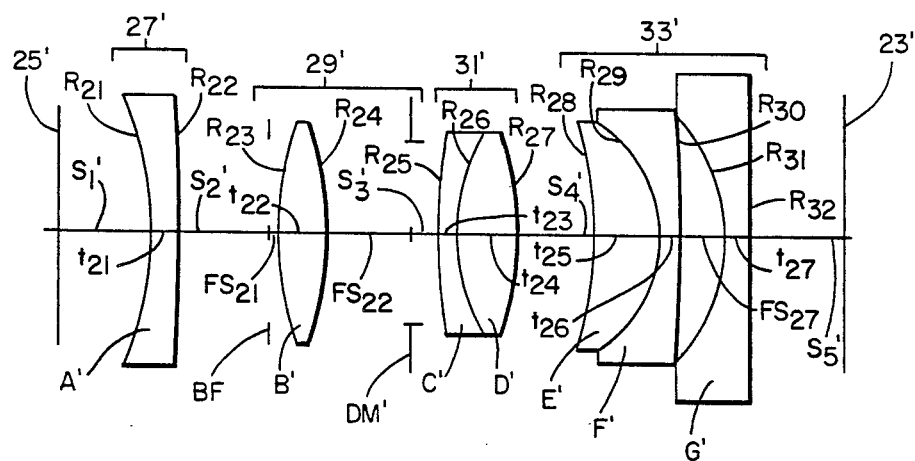
FIG. 4 schematically represents a second embodiment of the present invention.

FIG. 4 illustrates a second embodiment of the present invention which is generally similar in construction to the first embodiment described above. FIGS. 5 and 6 are tables giving the values for the various parameters. In FIGS. 4 and 5, the four components are given the same reference numerals but with a prime (') suffix. Similarly, the lens elements are given the same reference letters but with a prime (') suffix. Likewise, the variable spacings are given the same references but with a prime (') suffix.

In this second embodiment, the diaphragm DM' is placed behind the element B' at a fixed distance $FS_{22}$ and a baffle BF is included in front of element B' at a fixed distance $FS_{21}$. The variable spacing $S_2'$ is between the element A' and the baffle BF. The variable spacing $S_3'$ is between the diaphragm DM' and the component 31'.

Again, in this second embodiment, the third component 31' is a cemented doublet. However, in this embodiment, in the fourth component 33'; which again is a triplet, the lens elements E' and F' are cemented.

In this second embodiment, the aspheric surface $R_{23}$ of the second lens element B', has the formula:

$$X = \frac{CY^2}{1 + \sqrt{1 - C^2 Y^2}} + DY^4 + EY^6 + FY^8 + GY^{10}$$

wherein
C = 0.03467647
D = −0.42786 × 10$^{-4}$
E = −0.11867 × 10$^{-6}$
F = 0.98374 × 10$^{-8}$
G = −0.75315 × 10$^{-10}$
and its vertex radius is 28.838 mm.

The focal lengths of each of the four components, as well as the ratio L of those lengths to the minimum effective focal length, $F_s$, are given in the ensuing table:

| Component | Focal Length F | L = F/$F_s$ |
| --- | --- | --- |
| 27' | −54.75 mm | −1.56 |
| 29' | 27.01 mm | 0.77 |
| 31' | 45.32 mm | 1.29 |
| 33' | −19.38 mm | −0.55 |

The ratio of the extreme focal lengths of the second embodiment is 104.79:35.02, i.e., 2.99:1.

From FIG. 6 it will be seen that at a focal length of 35.02 mm, being $F_s$, the shortest focal length, the length from the vertex of the front surface $R_{21}$ of the front element A' to the film plane 23' is 57.56 mm and the telephoto ratio, i.e., the ratio of that length, 57.56 mm, to the focal length, $F_s$, is 1.64 which is less than 1.8. Also, at the long focal length, $F_L$, of 104.79 mm, the length from the front surface $R_{21}$ of the first element A' to the film plane 23' is 93.01 mm which is less than the focal length $F_L$.

The clear aperture of the lens A' is 21.70 mm which, together with the shortness of the distance between the vertex of the front surface $R_{21}$ of the front lens A' and the focal plane 23', ensures that a separate viewfinder can be placed close to the zoom lens without intruding on the field of view of the viewfinder, thus minimizing viewfinder parallax.

Figure 7:
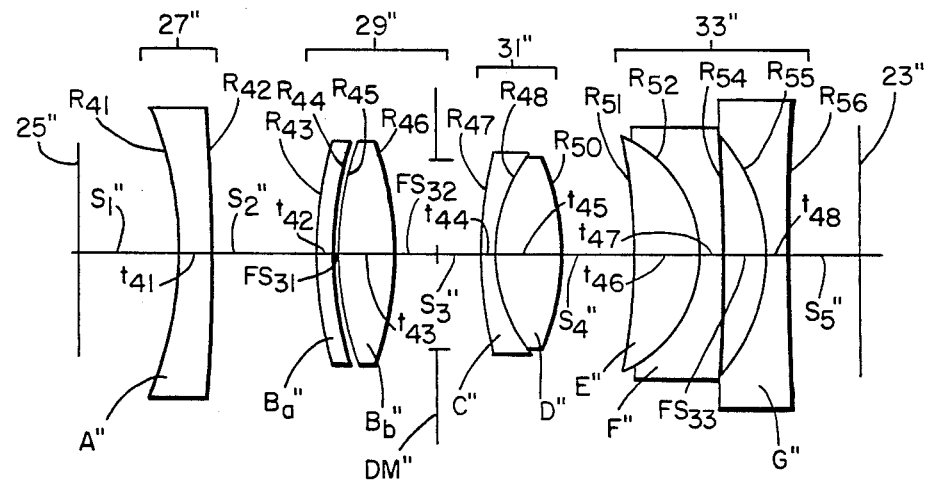
FIG. 7 schematically represents a third embodiment of the present invention.

FIG. 7 illustrates a third embodiment of the present invention and FIGS. 8 and 9 are tables giving the values of various parameters. In FIGS. 7 and 8, the components are given the same reference numerals as their counterparts in the first embodiment described above and illustrated in FIG. 1, but with the addition of a double prime ('') suffix. Similarly, the lens elements are given the same reference letter (with an exception described below), but with the addition of a double prime ('') suffix. Likewise, the variable spacings are given the same reference but with a double prime suffix added.

Again, in this third embodiment, the third component 31'' is a cemented doublet and, as in the case of the second embodiment, the lens elements E'' and F'' in the fourth component 33'' are a cemented doublet.

In this third embodiment, the second component 29'' is a doublet instead of a singlet. In the first and second embodiments, the lens elements B and B' are both glass with one aspheric surface, namely $R_3$ on lens element B, and $R_{23}$ on lens element B'. In order to avoid forming an aspheric surface on a glass element, the third embodiment places the aspheric surface $R_{43}$ on a plastic lens element $B_a''$ and has a glass lens element $B_b''$ with two spherical surfaces $R_{45}$ and $R_{46}$. Aspheric surfaces are relatively easily formed on plastics material elements. Plastic lenses are relatively susceptible to temperature changes. When subjected to a temperature change, their focal lengths change greater than is the case with glass. In order to avoid such disadvantageous effect, the plastic lens element $B_a''$ has no power. The glass element $B_b''$ has power but glass is markedly less susceptible to power change with temperature change than is the case with plastics material.

In this third embodiment, the diaphragm DM'' is placed at the rear of the second component 29'' and there is no baffle in front of the second component. The variable spacing $S_2''$ is between the element A'' and the element $B_a''$. The fixed spacing $FS_{32}$ is between the element $B_b''$ and the diaphragm DM''. The variable spacing $S_3''$ is between the diaphragm DM'' and the third component 31.

The aspheric surface $R_{43}$ again has the formula:

$$X = \frac{CY^2}{1 + \sqrt{1 - (K+1)C^2Y^2}} + DY^4 + EY^6 + FY^8 + GY^{10}$$

wherein
C = 0.0307541
D = −0.6111104 × 10⁻⁴
E = −0.2224872 × 10⁻⁶
F = 0.7541840 × 10⁻⁹
G = −0.1842949 × 10⁻¹⁰
K = 7.0508870

The focal lengths of each of the four components, as well as the ratio R of those lengths to the minimum effective focal length, $F_s$, are given to the ensuing table:

| Component | Focal Length F | L + F/$F_s$ |
|---|---|---|
| 27'' | −59.28 mm | −1.69 |
| 29'' | 27.81 mm | 0.79 |
| 31'' | 47.86 mm | 1.37 |
| 33'' | −19.87 mm | −0.57 |

The ratio of the extreme focal lengths of the third embodiment is 104.88:35.01, i.e., 3.00:1

From FIG. 9 it will be seen that at the shortest focal length, $F_s$, namely 35.01 mm, the length from the vertex of the front surface $R_{41}$ of the front element A'' of the film plane 23'', is 58.94 mm and the telephoto ratio, i.e. the ratio of that length, 58.94 mm, to the focal length, $F_s$, is 1.68 which is less than 1.8. Also, at the long focal length $F_L$, of 104.88 mm, the length from the front surface $R_4$ of the front element A'' to the film plane 23'' is 93.80 mm which is less than the focal length $F_L$.

The clear aperture of the lens A'' is 22.75 mm which, together with the shortness of the distance between the vertex of the front surface $R_{41}$ of the front lens A'' and the film plane 23'', ensures that a separate viewfinder can be placed close to the lens without intruding on the field of view of the viewfinder, thus minimizing viewfinder parallax.

The values of L = F/$F_s$ were given above for each of the components of each of the three embodiments and they were:

| COMPONENT | Embodiment 1 | | | Embodiment 2 | | | Embodiment 3 | | |
|---|---|---|---|---|---|---|---|---|---|
| | L | +10% | −10% | L | 10% | −10% | L | +10% | −10% |
| 27 | −1.41 | −1.55 | −1.56 | −1.56 | −1.72 | −1.40 | −1.69 | −1.86 | −1.52 |
| 29 | 0.79 | 0.87 | 0.71 | 0.77 | 0.85 | 0.69 | 0.79 | 0.87 | 0.71 |
| 31 | 1.58 | 1.74 | 1.42 | 1.29 | 1.42 | 1.16 | 1.37 | 1.51 | 1.23 |
| 33 | −0.72 | −0.79 | −0.71 | −0.55 | −0.61 | −0.50 | −0.57 | −0.63 | −0.51 |

In the table immediately above ±10% values are given for each of the L values. It will be seen that the largest and smallest L values in the table for each of the components are:

| Component | Largest L | Smallest L |
|---|---|---|
| 27 | −1.86 | −1.27 |
| 29 | 0.87 | 0.69 |
| 31 | 1.74 | 1.16 |
| 33 | −0.79 | −0.50 |

Embodiments of the present invention may be successfully constructed with the following ranges:
−1.86Fs < F₁ < −1.27Fs
0.87Fs > F₂ > 0.69Fs
1.74Fs > F₃ > 1.16Fs
−0.79Fs < F₄ < −0.50Fs
wherein F₁, F₂, F₃ and F₄ are the focal lengths of the components 27, 29, 31 and 33, respectively.

While in the above-described three embodiments the zoom ratios are 2.98:1; 2.99:1; and 3.00:1, respectively, it is believed that the invention may be embodied successfully in zoom lenses having a ratio close to 2.5:1.

The invention has been described in detail with particular reference to presently preferred embodiments, but it will be understood that variations and modifications can be effected within the spirit and scope of the invention.

What is claimed is:

1. A zoom lens comprising four components each movable axially to vary the focal length through a range of at least 2.5:1, including a front negative component, a positive component, a positive cemented doublet component and a rear negative component comprising three elements, and a diaphragm mounted with the first-mentioned positive component, the total length from the vertex of the front surface of the front lens element to the focal plane being less than $1.8F_S$ at the short focal length setting and less than $F_L$ the long focal length setting, wherein $F_S$ is the short focal length and $F_L$ is the long focal length.

2. A zoom lens as claimed in claim 1, wherein with said positive cemented doublet greater than unity $3 > VR > 1.8$.

3. A zoom lens as claimed in claim 1 or 2, wherein said negative component comprises front, second, and rear elements and with the ratio $VR_{12}$ of the Abbé V numbers of the front and second element greater than unity $3 > VR_{12} > 1.3$.

4. A zoom lens as claimed in claim 1, wherein the positive cemented doublet component includes a front element having a refractive index $N_C$ and a rear element having a refractive index $N_D$ and wherein $0.4 > |N_C - N_D| > 0.1$.

5. A zoom lens as claimed in claim 4, wherein with the ratio VR of the Abbé V numbers of the elements of said positive cemented doublet greater than unity $3 > VR > 1.8$ and said negative component includes front, second and rear elements and with the ratio $VR_{12}$ of the Abbé V numbers of the front and second elements greater than unity $3 > VR_{12} > 1.3$.

6. A zoom lens assembly made substantially according to the following specifications:

| GROUP | LENS | RADIUS | THICKNESS | SPACING | REFRACTIVE INDEX $N_d$ | Abbe No. $V_d$ |
|---|---|---|---|---|---|---|
| | | | | $S_1 = \infty$ | | |
| 27 | A | $R_1 = -25.7439$ | $t_1 = 2.500$ | | 1.71301 | 53.8 |
| | | $R_2 = -99.0606$ | | | | |
| | | | | $S_2 = \begin{cases} 7.622 \text{ at } 35.06 \\ 5.789 \text{ at } 50.48 \\ 3.266 \text{ at } 72.77 \\ 1.000 \text{ at } 104.56 \end{cases}$ | | |
| | | Diaphragm | | $FS_1 = 0.200$ | | |
| 29 | B | $R_3 = $ asphere | $t_3 = 3.800$ | | 1.80400 | 46.6 |
| | | $R_4 = -50.2153$ | | | | |
| | | | | $S_3 = \begin{cases} 8.023 \text{ at } 35.06 \\ 7.420 \text{ at } 50.48 \\ 6.221 \text{ at } 72.77 \\ 5.109 \text{ at } 104.56 \end{cases}$ | | |
| 31 | C | $R_5 = 46.3678$ | $t_4 = 1.500$ | | 1.84666 | 23.8 |
| | D | $R_6 = 16.5287$ | $t_5 = 6.269$ | | 1.49783 | 67.0 |
| | | $R_7 = -23.9031$ | | | | |
| | | | | $S_4 = \begin{cases} 8.699 \text{ at } 35.06 \\ 4.353 \text{ at } 50.48 \\ 1.972 \text{ at } 72.77 \\ 0.500 \text{ at } 104.56 \end{cases}$ | | |
| | E | $R_8 = -50.4295$ | $t_7 = 4.58$ | | 1.84666 | 23.8 |
| | | $R_9 = -18.7258$ | | | | |
| | | | | $FS_2 = 0.100$ | | |
| 33 | F | $R_{10} = -22.1134$ | $t_9 = 1.8$ | | 1.79952 | 42.2 |
| | | $R_{11} = -58.7660$ | | | | |
| | | | | $FS_3 = 3.588$ | | |
| | G | $R_{12} = -16.8917$ | $t_{11} = 2.00$ | | 1.69100 | 54.7 |
| | | $R_{13} = 146.044$ | | | | |
| | | | | $S_5 = \begin{cases} 8.25 \text{ at } 35.06 \\ 21.80 \text{ at } 50.48 \\ 39.76 \text{ at } 72.77 \\ 64.20 \text{ at } 104.56 \end{cases}$ | | | the ratios VR of the Abbé V numbers of the elements of

7. A zoom lens assembly made substantially according to the following specifications:

| GROUP | LENS | RADIUS | THICKNESS | SPACING | REFRACTIVE INDEX $N_d$ | Abbe No. $V_d$ |
|---|---|---|---|---|---|---|
| | | | | $S_1' = \infty$ | | |
| | | $R_{21} = -26.5947$ | | | | |

-continued

| GROUP | LENS | RADIUS | THICKNESS | SPACING | REFRACTIVE INDEX $N_d$ | Abbe No. $V_d$ |
|---|---|---|---|---|---|---|
| 27' | A' | | $t_{21} = 2.500$ | | 1.57958 | 53.7 |
| | | $R_{22} = -166.152$ | | | | |
| | | | | $S_2' = \begin{cases} 7.771 \text{ at } 35.02 \\ 7.353 \text{ at } 50.49 \\ 4.816 \text{ at } 72.80 \\ 1.000 \text{ at } 104.79 \end{cases}$ | | |
| | | Baffle | | $FS_{21} = 0.200$ | | |
| 29' | B' | $R_{23} = $ asphere | $t_{22} = 4.000$ | | 1.53172 | 48.8 |
| | | $R_{24} = -27.4940$ | | | | |
| | | Diaphragm | | $FS_{22} = 4.600$ | | |
| | | | | $S_3' = \begin{cases} 4.419 \text{ at } 35.02 \\ 3.312 \text{ at } 50.49 \\ 2.183 \text{ at } 72.80 \\ 1.563 \text{ at } 104.79 \end{cases}$ | | |
| | C' | $R_{25} = 54.4437$ | $t_{23} = 1.5$ | | 1.84666 | 23.8 |
| 31' | | $R_{26} = 15.0805$ | | | | |
| | D' | | $t_{24} = 5.125$ | | 1.49783 | 67.0 |
| | | $R_{27} = -17.0839$ | | | | |
| | | | | $S_4' = \begin{cases} 6.161 \text{ at } 35.02 \\ 2.723 \text{ at } 50.49 \\ 1.121 \text{ at } 72.80 \\ 0.500 \text{ at } 104.79 \end{cases}$ | | |
| | E' | $R_{28} = -40.7438$ | $t_{25} = 5.645$ | | 1.84666 | 23.8 |
| | | $R_{29} = -10.5410$ | | | | |
| 33' | F' | | $t_{26} = 3.890$ | | 1.70181 | 41.0 |
| | | $R_{30} = -150.263$ | | | | |
| | | | | $FS_{23} = 3.890$ | | |
| | | $R_{31} = -13.9956$ | | | | |
| | G' | | $t_{27} = 2.000$ | | 1.65016 | 39.2 |
| | | $R_{32} = 1438.91$ | | | | |
| | | | | $S_5' = \begin{cases} 7.95 \text{ at } 35.02 \\ 21.46 \text{ at } 50.49 \\ 38.41 \text{ at } 72.80 \\ 58.69 \text{ at } 104.79 \end{cases}$ | | |

8. A zoom lens assembly made substantially according to the following specifications:

| GROUP | LENS | RADIUS | THICKNESS | SPACING | REFRACTIVE INDEX $N_d$ | Abbe No. $V_d$ |
|---|---|---|---|---|---|---|
| | | | | $S_1'' = \infty$ | | |
| 27'' | A'' | $R_{41} = -28.9346$ | $t_{41} = 2.5$ | | 1.58913 | 61.3 |
| | | $R_{42} = -170.955$ | | | | |
| | | | | $S_2'' = \begin{cases} 8.701 \text{ at } 35.01 \\ 8.040 \text{ at } 50.48 \\ 4.990 \text{ at } 72.79 \\ 0.800 \text{ at } 104.88 \end{cases}$ | | |
| | | $R_{43} = $ ashpere | | | | |
| | $B_a''$ | | $t_{42} = 1.500$ | | 1.59044 | 30.9 |
| | | $R_{44} = 32.5160$ | | | | |
| 29'' | | | | $FS_{31} = 0.200$ | | |
| | | $R_{45} = 26.4507$ | | | | |
| | $B_b''$ | | $t_{43} = 4.400$ | | 1.54072 | 47.2 |
| | | $R_{46} = -32.5160$ | | | | |
| | | Diaphragm | | $FS_{32} = 3.500$ | | |
| | | | | $S_3'' = \begin{cases} 3.759 \text{ at } 35.01 \\ 2.433 \text{ at } 50.48 \\ 1.226 \text{ at } 72.79 \\ 0.612 \text{ at } 104.88 \end{cases}$ | | |
| | C'' | $R_{47} = 45.5291$ | $t_{44} = 1.500$ | | 1.84666 | 23.8 |
| 31'' | | $R_{48} = 14.1057$ | | | | |
| | D'' | | $t_{45} = 5.234$ | | 1.49783 | 67.0 |
| | | $R_{50} = -18.6600$ | | | | |
| | | | | $S_4'' = \begin{cases} 6.187 \text{ at } 35.01 \\ 2.786 \text{ at } 50.48 \\ 1.204 \text{ at } 72.79 \\ 0.500 \text{ at } 104.88 \end{cases}$ | | |

-continued

| GROUP | LENS | RADIUS | THICKNESS | SPACING | REFRACTIVE INDEX $N_d$ | Abbe No. $V_d$ |
|---|---|---|---|---|---|---|
| | | $R_{51} = -49.1546$ | | | | |
| | E'' | | $t_{46} = 5.330$ | | 1.84666 | 23.8 |
| | | $R_{52} = -10.7888$ | | | | |
| 33'' | F'' | | $t_{47} = 1.800$ | | 1.70181 | 41.0 |
| | | $R_{54} = -220.343$ | | $FS_{33} = 3.540$ | | |
| | | $R_{55} = -14.5565$ | | | | |
| | G'' | | $t_{48} = 2.000$ | | 1.65016 | 39.2 |
| | | $R_{56} = 201.766$ | | | | |
| | | | | $S_5'' = \begin{cases} 8.79 \text{ at } 35.01 \\ 22.61 \text{ at } 50.48 \\ 39.69 \text{ at } 72.79 \\ 60.38 \text{ at } 104.88 \end{cases}$ | | |

9. A zoom lens comprising four components each movable axially to vary the focal length through a range of at least 2.5:1, including a front negative component having a focal length $F_1$, a positive component having a focal length $F_2$, a positive cemented doublet component having a focal length $F_3$ and a negative component comprising three elements having a focal length $F_4$, the shortest focal length being $F_s$, wherein:
- $-1.86F_s < F_1 < -1.27F_s$
- $0.87F_s > F_2 > 0.69F_s$
- $1.74F_s > F_3 > 1.16F_s$
- $-0.79F_s < F_4 < -0.50F_s$.

10. A zoom lens comprising four components each movable axially to vary the focal length through a range of at least 2.5:1, including a front negative component having a focal length $F_1$, a positive component having a focal length $F_2$, a positive cemented doublet component having a focal length $F_3$ and a negative component comprising three elements having a focal length $F_4$, the shortest focal length being $F_s$, wherein:
- $-1.55F_s < F_1 < -1.27F_s$
- $0.87F_s > F_2 > 0.17F_s$
- $1.74F_s > F_3 > 1.42F_s$
- $-0.79F_s < F_4 < -0.71F_s$.

11. A zoom lens comprising four components each movable axially to vary the focal length through a range of at least 2.5:1, including a front negative component having a focal length $F_1$, a positive component having a focal length $F_2$, a positive cemented doublet component having a focal length $F_3$ and a negative component comprising three elements having a focal length $F_4$, the shortest focal length being $F_s$, wherein:
- $-1.72F_s < F_1 < -1.40F_s$
- $0.85F_s > F_2 > 0.69F_s$
- $1.29F_s > F_3 > 1.16F_s$
- $-0.61F_s < F_4 < -0.50F_s$.

12. A zoom lens comprising four components each movable axially to vary the focal length through a range of at least 2.5:1, including a front negative component having a focal length $F_1$, a positive component having a focal length $F_2$, a positive cemented doublet component having a focal length $F_3$ and a negative component comprising three elements having a focal length $F_4$, the shortest focal length being $F_s$, wherein:
- $-1.86F_s < F_1 < -1.52F_s$
- $0.87F_s > F_2 > 0.71F_s$
- $1.51F_s > F_3 > 1.23F_s$
- $-0.63F_s < F_4 < -0.51F_s$.

* * * * *

UNITED STATES PATENT OFFICE
CERTIFICATE OF CORRECTION

PATENT NO. : 4,756,609

DATED : July 12, 1988

INVENTOR(S) : Lee R. Estelle

It is certified that error appears in the above-identified patent and that said Letters Patent are hereby corrected as shown below:

Col. 1, line 57, "ae" should read --are--.

Col. 6, line 19, after A "of" should be --to--.

Col. 6, in the table after line 36, under Embodiment 1, -10%, "1.56" should be -- -1.27 --.

Col. 7, cl. 1, line 13, after "negative" insert --negative--.

Col. 8, cl. 3, line 4, after "negative" insert --negative--.

Col. 8, cl. 5, line 16, after "negative" insert --negative--.

Cols. 7 & 8, Cl. 6, in the table under Group 31, in the Column Headed:

$$S_4 = \begin{matrix} "(8.699 \text{ at } 35.06 \\ (4.353 \text{ at } 50.48 \\ (1.972 \text{ at } 72.77 \\ (0.500 \text{ at } 104.56" \end{matrix}$$

should read $$S_4 = \begin{matrix} --(8.699 \text{ at } 35.06 \\ (4.353 \text{ at } 50.48 \\ (1.973 \text{ at } 72.77 \\ (0.500 \text{ at } 104.56-- \end{matrix}$$

Col. 11, cl. 9, line 25, after "negative" insert --negative--.

Col. 11, cl. 10, line 36, after "negative" insert --negative--.

Col. 12, cl. 11, cline 24 before "component" insert --negative--.

Col. 12, cl. 12, line 34, after "negative" insert --negative--.

UNITED STATES PATENT OFFICE
CERTIFICATE OF CORRECTION

PATENT NO. : 4,756,609

DATED : July 12, 1988

INVENTOR(S) : Lee R. Estelle

It is certified that error appears in the above-identified patent and that said Letters Patent are hereby corrected as shown below:

In the front page, in the 5th line of the Abstract, insert "negative" after -- negative --.

Signed and Sealed this

Sixth Day of December, 1988

Attest:

DONALD J. QUIGG

Attesting Officer

Commissioner of Patents and Trademarks